HIGH-FREQUENCY CURRENT GENERATOR

Filed June 30, 1947

INVENTOR.
Hugh J. O'Neil.
BY
Frank C. Kearman
ATTORNEY

Patented Feb. 28, 1950

2,499,155

UNITED STATES PATENT OFFICE 2,499,155

HIGH-FREQUENCY CURRENT GENERATOR

Hugh J. O'Neil, Bay City, Mich., assignor of one-third to Bernard E. O'Neil and one-third to James R. O'Neil, both of Bay City, Mich.

Application June 30, 1947, Serial No. 757,990

11 Claims. (Cl. 250—17)

The present invention relates to high frequency current generators and more particularly to high frequency current generators which are capable of generating oscillatory and pulsating currents over a wide range of frequencies. While the invention is of general utility, it is particularly useful as an oscillatory current generator for an ultra high frequency transmitter. The invention is also of particular utility in low and medium frequency circuits such as vibrator circuit sand periodic "flashing" circuits wherein it is necessary to produce current interruptions, or impulses of current, at a fixed or variable frequency.

For some purposes it is desirable to have an inexpensive light-weight transmitter which will operate in the ultra high frequency range. In particular, frequency bands in the range of 400-500 mc. have recently been made available to unlicensed operators, and it is extremely desirable that an economical, compact transmitter be provided which will operate in this frequency range. Other bands in the ultra high frequency range will undoubtedly find commercial application, and it is apparent that the demand for a compact, inexpensive light-weight oscillator which will operate on ultra high frequency bands will increase greatly. Oscillation generators which employ gaseous discharge devices, and in particular, the cold cathode discharge device, have long been known to be advantageous from the standpoint of economy and compactness. However, this type of oscillation generator has heretofore suffered the disadvantage of possessing a limited frequency range. This upper frequency limit has generally been attributed to the time necessary to de-ionize the gas after the discharge current has been interrupted. The type of oscillator which has generally been used for ultra high frequency work, comprising a cavity resonator system or a Lecher wire tuned grid, tuned plate system, has the disadvantage of requiring a separate source of power to heat the filament, and in many cases this filament power supply has to be well regulated, which means a heavier, larger power unit. Also, the conventional ultra high frequency oscillator may require an additional stage of amplification to obtain the desired output power, which means an additional drain on the power supply. Furthermore, the conventional high frequency oscillator is generally more complicated and expensive than the low frequency gaseous discharge tube oscillators.

The primary object of the invention is to provide an improved high frequency current generator in which one or more of the above-mentioned disadvantages are eliminated.

Another object of the invention is to provide an improved high frequency current generator which is capable of producing oscillatory and pulsating currents over a wide range of frequencies.

Another object of the invention is to provide a compact and economical gaseous discharge tube current generator which is designed to produce oscillatory and pulsating currents over a substantially greater range of frequencies than heretofore has been possible with tubes of this type.

Another object of the invention is to provide a compact and economical high frequency current generator in which a two-electrode gaseous discharge tube is employed to produce oscillatory currents in the ultra-high frequency range.

In accordance with one embodiment of the invention, there is provided a circuit interrupter in the form of a cold cathode gaseous discharge device which is connected to one end of a section of transmission line. The other end of the transmission line is connected to a source of potential, such as a battery, through large inductance coils which serve to isolate the battery from the oscillations produced in the transmission line section. In accordance with one specific embodiment of the invention, there is included a dipole antenna which, when connected to the transmission line section, will radiate the oscillations produced therein in accordance with the normal radiation pattern of the dipole antenna.

Other objects and advantages of the invention will become apparent during the course of the following description of the accompanying drawing wherein—

Figure 1:
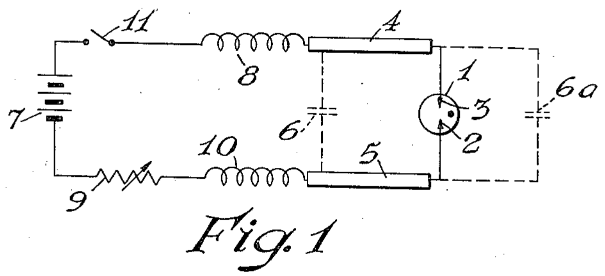
Figure 1 is a schematic circuit diagram of one form of the invention.

Referring now to Figure 1 of the drawing, the current interrupter is shown as a tube 1, having a cathode 2 and an anode 3, the space surrounding these electrodes being filled with a suitable gas, such as hydrogen. The cathode of the current interrupter is not heated by any internal or external source, and the interrupter, therefore, is of the general class of discharge devices designated as cold cathode discharge devices. It should be pointed out that while tube 1 has been designated as a cold cathode discharge device, any device will operate satisfactorily which possesses the required characteristics, as set forth in more detail in the following description. Connected to the anode 3 of the tube 1, is a feeder 4 which, together with a feeder 5, which is connected to the cathode 2, is equivalent to a section of a parallel wire transmission line. These feeders may be in the form of lead-in wires of conventional diameter, or may be in the form of heavy bus wire or copper tubing. It will be seen that the two feeders considered together constitute a section of a transmission line which has an equivalent inductance and capacitance which is dependent upon the diameter, the spacing between feeders, and the length of feeder which is used. The equivalent capacity between the feeders has been indicated in dotted lines as capacitance 6. The anode feeder 7 is connected to the positive terminal of the battery 7 through a high inductance choke 8. The cathode feeder is connected to the negative terminal of the battery 7 through a high inductance choke 10 and a variable resistance 9. Chokes 8 and 10 are identical and serve to isolate the oscillating transmission line section from the power supply, and while these chokes should theoretically have an infinite inductance, a value somewhat above 500 henries has been found to be satisfactory in actual practice.

Referring now in detail to the design and construction of the gas-filled tube, or current interrupter; as has been stated before, the interrupter comprises a positive electrode or anode and a negative electrode or cathode, these electrodes being spaced a certain distance apart in an insulating medium. The anode may be constructed of any metallic material which is a good conductor of electricity, is mechanically strong, and will not vaporize or combine chemically with the insulating medium at the operating temperature of the interrupter. The electrodes are so adjusted in the insulating medium that upon application of a high potential between the electrodes, which will be termed the breakdown voltage of the interrupter, a discharge of current occurs through the insulating medium, and the resistance of the gap between the electrodes changes from the high value which it has before the discharge to a relatively low value. It is important that an insulating medium be selected that will not be affected chemically by the electrical discharge and which will have a uniform breakdown voltage per unit length. It is also important that the interrupter be constructed so that the gap resistance quickly returns to a relatively high value after each impulse. It is obvious, therefore, that the current interrupter is quite different from the conventional arc discharge in which a steady flow of current exists between the electrodes, this steady current being produced by ionization of the vaporized electrode material. As will be seen from the following description of the operation of the circuit per se, it is desirable that the flow of electrons which constitutes the discharge between electrodes will take place in one direction only; viz., from cathode to anode. The property of having the discharge take place in one direction only may be improved by use of a suitable material for the cathode, one such material which has been found to produce such improvement being the oxide-coated aluminum cathode.

In considering the operation of the circuit of Figure 1, it will be seen that the cathode and anode feeders possess distributed capacity and inductance per unit length, which distributed capacity and inductance, for the purpose of analysis, may be considered as a lumped or equivalent capacity and inductance. The equivalent capacity between feeders has been indicated by the equivalent capacitor 6, and it is obvious that the distributed inductance of the feeders may be replaced by a similar equivalent inductance, although this inductance has not been shown in the drawing.

In addition to the effective feeder capacitor 6, there is also another capacity in the high frequency circuit, this capacity existing in the interrupter unit itself, between the aluminum metal of the cathode and the surrounding gaseous ions, with the oxide film as the dialetric. This capacity effect of the oxide-coated aluminum cathode is similar to that of the common aluminum electrolytic condenser used in radio filter circuits.

The size or degree of this cathode capacity, which will be termed capacitor $6^a$ is determined by two factors, first, the area of the cathode, and second, the thickness of the oxide film, and the thickness of this film in turn depends upon the voltage used in its formation.

To form the oxide film, the clean aluminum cathode and the anode are assembled close together in an atmosphere of rarified oxygen or air. Then a steady, direct voltage of the proper polarity, that is, aluminum negative, is applied to the electrodes until the film reaches the maximum thickness for that voltage. Then the forming voltage is removed, and the oxygen replaced by an inert gas which will not injure or alter the film.

As will be seen later on, the proper forming voltage to use will depend upon the frequencies at which the unit is to operate, and the particular characteristics desired.

After the oxide film has been properly formed, it will be found to possess certain peculiar electrical properties which will be enumerated below.

First: The oxide film is electrically polarized, that is, it will allow a current through it freely in one direction only, namely, from the aluminum metal to the oxide film, not in the reverse direction unless excessive voltages are applied to it.

Second: The total current intensity flowing through the film per unit area is proportional to the square of the applied voltage, thus doubling the applied voltage will cause four times as great a current to flow.

Third: If the applied voltage be fixed, the resistance of the film is found to be proportional to its thickness; however, for any given film thickness the resistance appears to be inversely proportional to the applied voltage.

Fourth: The current through the film is found to be proportional to the square of the applied voltage, only up to a certain maximum voltage, in which case the film overheats and breaks down, causing the film current to follow ohms law.

Fifth: The breakdown potential of the film is identical with the voltage used in its formation; however, films can be formed to handle voltages only up to a certain maximum potential, which is the absolute limit of the aluminum oxide film strength.

Sixth: This cathode capacity is not a true condenser, since it is able to store electrical energy only until its potential is raised to a certain critical voltage, at which point a leakage current commences to flow through the film, the intensity of which is proportional to the square of the applied voltage above this critical potential.

Bearing the above properties in mind, the explanation of the interrupter follows.

To place this circuit in operation, switch 11 is closed, and the battery potential is raised until a discharge is initiated through the interrupter. The required potential to cause a discharge in the interrupter depends upon the separation of the electrodes, the type of gas used, and its pressure.

It has been found that for any type of gas, the best operating pressure is that pressure that will allow the greatest current to flow with the lowest applied voltages. Therefore, this breakdown potential can be adjusted by regulating the electrode spacing.

Immediately before discharge occurs in the interrupter, capacitors 6 and $6^a$ are in the state of electrostatic charge provided by battery 7 through isolating chokes 8 and 10. As soon as this static charge on capacitors 6 and $6^a$ reaches the breakdown potential of the interrupter, current will begin to flow through the interrupter gap. Since the effect of the great inductance of chokes 8 and 10 is to oppose any rapid current fluctuation in the circuit, the battery current does not flow during the interrupter discharge, the only current flowing through the gap during discharge being the static energy of capacitors 6 and $6^a$.

Now, since capacitor 6 is separated from the interrupter by the feeder inductance, capacitor $6^a$ will begin to discharge first; since at the beginning of the discharge the voltage across the interrupter electrodes is relatively high, fairly large currents will flow through the interrupter at this time. However, as the discharge continues, the gap voltage will begin to drop, which in turn causes the gap current to diminish even more rapidly because the film current is proportional to the square of the applied voltage. The overall effect of the progressive gap voltage drop is to cause the film current to decrease more or less sharply to the minimum critical current density of the oxide film, and hence the discharge is interrupted.

At this point, if the inductance and capacity of the feeders have been properly adjusted, capacitor 6 will start to discharge toward the interrupter, thus raising the potential of capacitor $6^a$ sufficiently for another discharge to occur.

Obviously, for proper operation, the inductance and capacity of the feeders should be so adjusted as to cause the discharge of capacitor 6 to occur one half cycle behind that of capacitor $6^a$, otherwise, the discharge of capacitor 6 will be out of phase with the interrupter frequency, causing the output of the device to consist of several harmonics of the fundamental frequency, which, needless to say, is undesirable.

However, although it is best to tune the external circuit to the same oscillation period of the interruption frequency, good results may be obtained with the feeders tuned to an even multiple of the impulse frequency, in which case evenly spaced power nodes will appear along the feeders. This effect is similar to that of the co-axial cable which is used to convey high frequency currents considerable distances with relatively low loss.

It is evident from the above that the impulse frequency is indepndent of the inductance and capacity of the feeders, and that it is determined by the inherent properties of the particular interrupter design. The only purpose of the external tuned circuit is to promote stable operation and to resonate the output.

The cause of the interruptions in this device is the instability of the relationship between the gap voltage and current changes; in other words, the current changes in the oxide film are out of proportion with the voltage changes, thus causing the interrupter discharge to be in the form of rapid pulsations of continuous amplitude when the interrupter is properly designed and operated.

As will be explained, the impulse frequency is determined by the characteristics of the cathode film of any particular interrupter unit.

It is evident that the impulse frequency will be determined by the speed with which capacitor $6^a$ can be charged and discharged, and the speed with which any capacitor connected to a discharge circuit of zero resistance and inductance can be charged and discharged depends upon three major factors; first, the capacity of the condenser; second, the fixed rate of current flow from the charging source; and third, the potential to which the condenser must be raised in order for discharge to occur.

Inasmuch as any cathode of fixed area and film thickness may be considered as having a fixed capacity, therefore, any cathode film of fixed thickness will possess a definite value of resistance at any given voltage; however, for any given film thickness, the coefficient of film resistance is inversely proportional to the applied voltage.

Therefore, since the thicker cathode films have a greater coefficient of resistance per unit area, a larger inter-electrode voltage fluctuation will be required to charge and discharge the energy of the cathode capacitance $6^a$ than in the case of the thinner films; consequently, it is evident that if the amount of coulombs per sec. in the charging current is fixed; there will be fewer impulses per sec. with a larger voltage fluctuation than with a lower inter-electrode voltage fluctuation. Thus, it can be seen that for any given charging current rate, the impulse frequency will be higher with thin cathode films than with thicker ones and vice-versa, and it will, therefore, be obvious that it is necessary to decide upon the desired impulse frequency before the cathode film is formed in order to determine the correct forming voltage to use.

It will be noted that the cathode area does not affect the impulse frequency, although the cathode capacity is proportional to the film area. The reason for this is that it is not the overall cathode capacity that is important, but only the capacity per unit area of film, which is predetermined by the thickness of the oxide film.

It is therefore evident that for any given fixed rate of input power, the output power will theoretically be identical per unit film area for both thick and thin films, although the inter-electrode voltage fluctuations will be greater with thick films than with thinner ones. The reason for this is that with thin films there will be more impulses per sec. than with thicker ones; therefore, the average intensity of the oscillatory current will be greater with thin films than with thicker ones, although the oscillatory potential is lower.

As previously mentioned, the oxide film can handle only a certain maximum current per unit area. Therefore, if it is desired to increase the power output two things may be done; first, the cathode area may be increased, thus allowing greater current to flow; or second, two or more identical interrupter units may be used in series, which increases the total high frequency potential by a factor proportional to the number of units used. However, as the capacity effect of too great a cathode area is undesirable at high frequencies, the second method is best in this case.

The fact that the impulse frequency is predetermined by the cathode film thickness is valuable, since it provides a means for conveniently controlling the frequency of this device at the troublesome ultra-high frequencies. And further, since it is evident that the films can be formed of molecular thickness, the maximum upper frequency limit of this type of oscillator approaches that of visible light.

Figure 2:
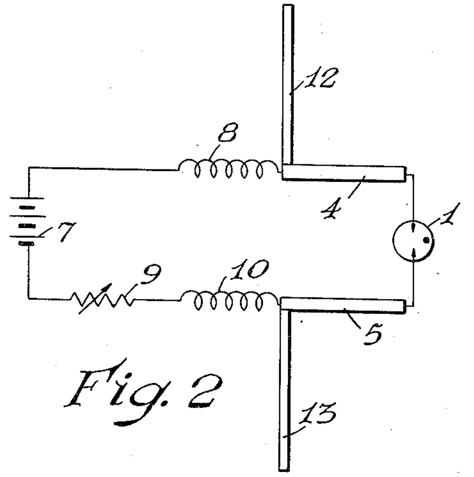
Figure 2 is a modification of Figure 1 which is particularly adapted to operate as a high frequency transmitter.

Figure 2 is a modification of Figure 1 in which the basic circuit described above has been adapted to operate as a continuous wave transmitter. To accomplish this, dipole sections 12 and 13 have been connected to the junctions of isolating chokes 8 and 10, and the feeders. The length of these dipoles is adjusted for the desired radiation pattern at the operating frequency of the oscillator unit, and this circuit has been found to be satisfactory on wave lengths from one to twenty metres.

Figure 3:
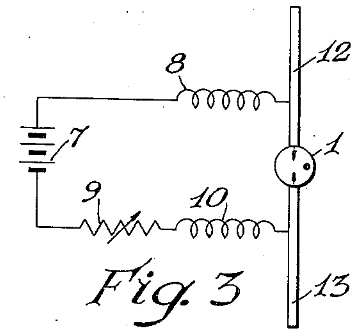
Figure 3 is a modification of Figure 2 which is adapted to operate in the ultra-high frequencies.

Figure 3 shows a circuit that will operate on wave lengths below one metre. In this ultra-high frequency modification, the essential components of the circuit shown in Figure 1 have been retained, with the exception of the anode and cathode feeders. In place of these feeders, a portion of the dipole sections 12 and 13 have been substituted, thus realizing the absolute minimum of external inductance and capacity.

Figure 4:
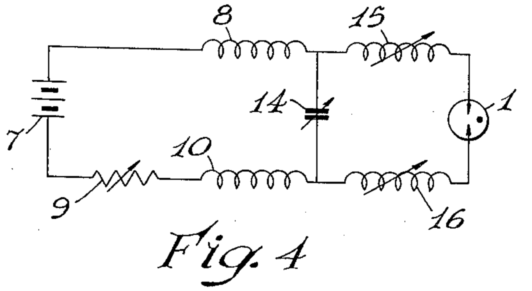
Figure 4 is a modification of the form of the invention shown in Figure 1 which is adapted to operate at low and medium frequencies; and, Figure 5 is a further modification of Figure 1.

A further modification of Figure 1 is shown in Figure 4 wherein the anode and cathode feeders have been replaced by a variable capacity 14 and two variable inductances 15 and 16; this circuit is adapted to operate at lower frequencies than that of the above circuits. The variable inductances 15 and 16 are for the purpose of balancing both sides of the circuit, and variable capacity 14 is for the purpose of resonating the external circuit with interruption frequency. Any conventional antenna system, such as the dipole antenna shown in Figure 2, can be used with the low frequency oscillator of Figure 4.

Figure 5:
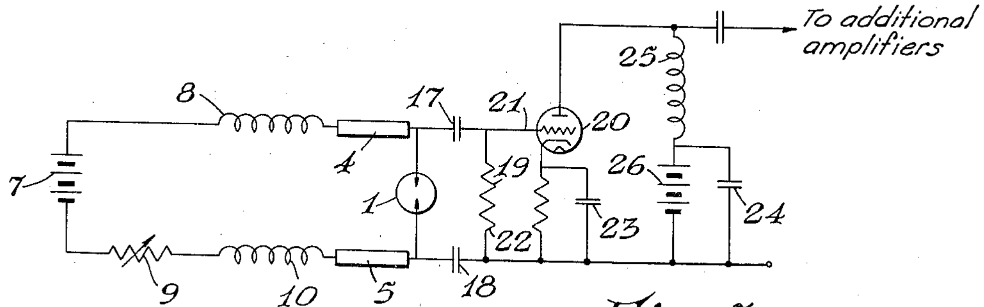

In Figure 5 the output of the high frequency current interrupter is shown connected to a chain of power amplifiers. Connection to the power amplifier chain, the first stage of which is shown in Figure 5, is made from the anode and cathode feeders 4 and 5, through coupling condensers 17 and 18 to the grid 21 of triode amplifier 20. Triode amplifier 20 is biased by a cathode resistor 22 and cathode bypass condenser 23 to the proper operating point on the grid voltage-plate current characteristic, the grid is grounded through resistor 19, and the plate load impedance may be either in the form of an untuned choke 25, or a tuned plate tank circuit may be used. Condenser 24 is used to bypass any undesirable voltage fluctuations in the power supply 26.

While there has been shown an oscillator circuit utilizing a hydrogen filled discharge tube as the current interrupting means, it will be understood that other means for producing this result may be utilized. For instance, two electrode tubes containing other gases such as neon, argon, etc., will operate satisfactorily. Also moderately successful operation has been obtained with these gases at normal atmospheric pressure. Likewise, it is possible to use two electrode tubes in which the cathode is indirectly heated to increase ionization.

It is to be understood, that the various forms of the invention herewith shown and described are to be taken as preferred embodiments of the invention, and that various changes in the arrangement of parts may be made without departing from the spirit of the invention or the scope of the subjoined claims.

What I claim is:

1. A high frequency current interrupter comprising a series circuit formed by a first inductance, a first feeder, an ionic discharge device, a second feeder, a second inductance, a variable resistance and a source of unidirectional voltage, said ionic discharge device having two electrodes, at least one of said electrodes being coated with a metallic oxide film whereby oscillations in the ultra high frequency range are generated in said ionic discharge device, the frequency of said oscillations being inversely proportional to the capacitance between said first and second feeders.

2. A high frequency current interrupter comprising a series circuit formed by a first inductance, a first feeder, a gaseous discharge device, a second feeder, a second inductance, a variable resistance and a source of unidirectional voltage said first and second feeders together forming a resonant circuit, said gaseous discharge device having two electrodes at least one of which is coated with a film of aluminum oxide, said film having a non-linear current-voltage characteristic whereby oscillations in the ultra high frequency range are produced by said gaseous discharge device.

3. An oscillation generator for generating high frequency oscillations comprising an ionic discharge device, said device having two electrodes at least one of which is coated with a metallic oxide film, a portion of the current-voltage characteristic of said film being non-linear, a resonant circuit and means for applying to said ionic discharge device through said resonant circuit a unidirectional voltage of sufficient value to cause said film to operate in the non-linear portion of the current-voltage characteristic of said film.

4. An oscillation generator for generating high frequency oscillations comprising a parallel wire transmission line, a two-electrode ionic discharge device connected across one end of said transmission line, at least one of the electrodes of said ionic discharge device being coated with a metallic oxide film, said film having a current-voltage characteristic a portion of which is non-linear, and a source of unidirectional voltage connected to the other end of said transmission line through a balanced inductive circuit, said unidirectional voltage source being variable over a voltage range sufficient to cause said film to operate in the non-linear portion of the current-voltage characteristic thereof.

5. An oscillation generator for generating continuous wave oscillations of centimeter wave length comprising an ionic discharge device and a resonant circuit, said discharge device having two electrodes at least one of which is coated with a metallic oxide film, means for applying a breakdown potential to said electrodes through said resonant circuit, said oxide film having a sufficiently non-linear current-voltage characteristic to maintain oscillations set up in said resonant circuit upon application of said breakdown potential to said resonant circuit.

6. In a high frequency generator a two electrode ionic discharge device, at least one of the electrodes of said ionic discharge device being coated with a metallic oxide film, a resonant circuit, means for periodically short circuiting said resonant circuit through said discharge device and means for radiating a substantial portion of the high frequency energy produced in said resonant circuit.

7. An oscillation generator for generating high frequency oscillations comprising an ionic discharge device having two electrodes at least one of which is coated with a metallic oxide film, a resonant circuit, means for storing energy in said resonant circuit, means for periodically short circuiting said resonant circuit through said discharge device, and means for radiating a portion of said stored energy, said last named means comprising a di-pole antenna connected across at least a portion of said resonant circuit.

8. A current interrupter comprising a condenser, means for charging said condenser to a predetermined breakdown potential through a balanced inductive circuit, and means for periodically discharging said condenser, said last named means including a two-electrode gaseous discharge device, at least one of the electrodes of said device being coated with a metallic oxide film, said film having a non-linear current-voltage characteristic in the region of said breakdown potential.

9. An oscillation generator comprising a condenser, means for charging said condenser to a predetermined breakdown potential through a first balanced inductive circuit, and means for periodically discharging said condenser through a second balanced inductive circuit, said last named means including a two-electrode gaseous discharge device, at least one of the electrodes of said device being coated with a metallic oxide film, said film having a non-linear current-voltage characteristic in the region of said breakdown potential.

10. A current interrupter comprising a first series circuit formed by a first inductance, a condenser, a second inductance, a resistor and a source of unidirectional voltage, and a second series circuit formed by a third inductance, a two electrode ionic discharge device, a fourth inductance and said condenser at least one of the electrodes of said device being coated with a metallic oxide film, said film having a non-linear current-voltage characteristic.

11. A variable frequency oscillation generator comprising a first series circuit formed by a first inductance, a variable condenser, a second inductance, a variable resistor and a source of unidirectional voltage, and a second series circuit formed by a first variable inductance, a two electrode ionic discharge device, a second variable inductance and said variable condenser at least one of the electrodes of said device being coated with a metallic oxide film, said film having a non-linear current-voltage characteristic.

HUGH J. O'NEIL.

REFERENCES CITED

The following references are of record in the file of this patent:

UNITED STATES PATENTS

| Number | Name | Date |
|---|---|---|
| 768,004 | Stone | Aug. 16, 1904 |
| 824,003 | DeForest | June 19, 1906 |
| 979,276 | DeForest | Dec. 20, 1910 |
| 1,166,892 | Fessenden | Jan. 4, 1916 |
| 1,173,562 | Ditcham | Feb. 29, 1916 |
| 1,369,281 | Roos | Feb. 22, 1921 |
| 2,471,401 | Ahier et al. | May 31, 1949 |

FOREIGN PATENTS

| Number | Country | Date |
|---|---|---|
| 294,977 | Great Britain | Sept. 30, 1929 |